United States Patent [19]
Kakizaki et al.

[11] Patent Number: 5,771,690
[45] Date of Patent: Jun. 30, 1998

[54] ENGINE EXHAUST PURIFIER

[75] Inventors: Shigeaki Kakizaki; Kenichi Sato, both of Yokohama; Koji Ishihara, Yokosuka; Mikio Matsumoto, Yokohama, all of Japan

[73] Assignee: Nissan Motor Co., Ltd., Kanagawa, Japan

[21] Appl. No.: 783,905

[22] Filed: Jan. 16, 1997

[30] Foreign Application Priority Data

Jan. 22, 1996 [JP] Japan ..................... 8-008563

[51] Int. Cl.⁶ ..................................... F01N 3/28
[52] U.S. Cl. ...................... 60/288; 60/277; 422/171
[58] Field of Search ............... 60/277, 288; 422/171

[56] References Cited

U.S. PATENT DOCUMENTS

| | | | |
|---|---|---|---|
| 5,233,830 | 8/1993 | Takeshima | 60/288 |
| 5,349,816 | 9/1994 | Sanbayashi | 60/288 |
| 5,365,734 | 11/1994 | Takeshima | 60/288 |

FOREIGN PATENT DOCUMENTS

| | | |
|---|---|---|
| 57-210116 | 12/1982 | Japan . |
| 6-10656 | 1/1994 | Japan . |

*Primary Examiner*—Douglas Hart
*Attorney, Agent, or Firm*—McDermott, Will & Emery

[57] ABSTRACT

Two catalytic converters are disposed in series midway in an engine exhaust passage, and a by-pass valve selectively introduces exhaust into the upstream converter and a by-pass passage which by-passes the converter. When the catalyst temperature of the upstream catalytic converter exceeds a threshold value A, exhaust is routed to the by-pass passage. The catalyst temperature in the state when exhaust is routed to the upstream catalytic converter under steady state engine running conditions is stored as a convergence temperature depending on the engine running conditions.

When exhaust is routed to the by-pass passage, exhaust is re-introduced into the upstream converter only when both the catalyst temperature and the convergence temperature corresponding to the running conditions at that time are less than a threshold value B which is less than the threshold value A.

In this way, hunting of the by-pass valve operation is prevented.

11 Claims, 11 Drawing Sheets

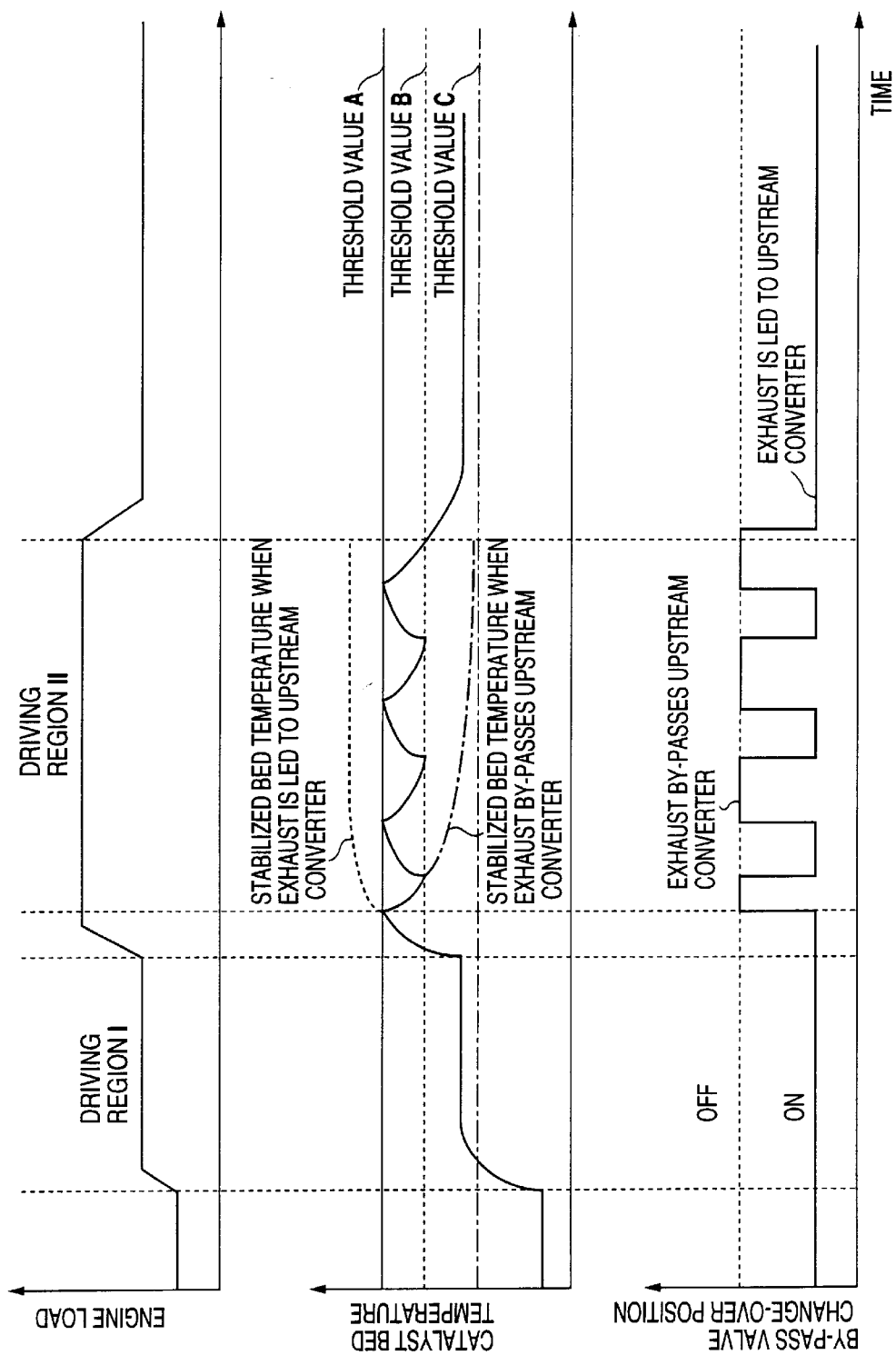

ENGINE EXHAUST PURIFIER

FIELD OF THE INVENTION

This invention relates to an engine which has two catalytic converters arranged in series in an exhaust passage, and more specifically, to a device which changes over two catalysts according to the driving conditions.

BACKGROUND OF THE INVENTION

An exhaust purifier which comprises two types of catalytic converter disposed in series in an exhaust passage of an automobile engine is disclosed in Tokkai Sho 57-210116 published by the Japanese Patent Office in 1982. This device comprises a by-pass passage which by-passes an upstream converter, and a by-pass valve which selectively leads engine exhaust to the upstream converter according to the exhaust temperature. The device guides exhaust to the upstream converter which is nearer the engine and consequently at a high exhaust temperature immediately after start-up, for example, when the exhaust temperature is low, thereby allowing purification to occur at an early stage. When exhaust temperature rises, the by-pass valve switches over so that exhaust flows directly into the downstream catalytic converter through the by-pass passage. At that point, the downstream catalytic converter is also fully activated, so purification of exhaust may be performed without depending on the upstream catalytic converter. Moreover, by preventing exhaust flow to the upstream catalytic converter, excessive rise of catalyst temperature in the upstream converter, which would lead to catalyst deterioration, is prevented. The change-over of by-pass valve is performed according to the detection temperature of a temperature sensor situated in the vicinity of the upstream catalytic converter.

In this case, it is catalyst temperature which is related to the activation of the catalyst and not exhaust temperature. It may thus be said that this device allows substitution of the catalyst temperature by the exhaust temperature at the converter inlet. However, the exhaust temperature at the catalyst inlet does not necessarily correspond with the catalyst temperature inside the catalytic converter. For example, the air-fuel ratio of the air-fuel mixture supplied to the engine may be different according to the operating range of the engine, and when the air-fuel ratio varies, the catalyst heat of reaction will also be different.

Moreover, when the exhaust flowrate varies, the heat transfer coefficient will change, and the heat variation characteristics of catalyst will also vary depending on the heat capacity of the catalyst.

For these reasons, it is difficult to precisely detect catalyst temperature solely from the exhaust temperature.

Tokkai Hei 6-10656 published by the Japanese Patent Office in 1994 discloses how, in a similar exhaust purifier, catalyst temperature is estimated from driving conditions such as engine load or rotation speed. Hence if this method of estimating catalyst temperature could be used in conjunction with the exhaust catalyst temperature obtained in the former device to find the catalyst temperature, the catalyst temperature obtained would definitely be more precise. However even in this case, there are still problems regarding the control of by-pass valve change-over which is a parameter of catalyst temperature, as shown in FIGS. 11A–11C.

These figures show engine load in the aforesaid device, the temperature of a catalyst bed which supports the catalyst in the upstream catalytic converter, and the change-over position of the by-pass valve. The catalyst bed temperature is effectively equal to the catalyst temperature. The driving region I of FIG. 11A uses the upstream catalytic converter, while the driving region II is a region which by-passes the upstream catalytic converter. A shift from region I to region II occurs when the catalyst bed temperature rises to a threshold value A shown in FIG. 11B, and a shift from region II to region I occurs when the catalyst bed temperature falls to a threshold value B. The difference between the threshold values A and B is therefore hysteresis.

The temperature of the catalyst bed suddenly fluctuates depending on whether exhaust is led to the catalytic converter, and as a result, in the driving region II, so called hunting occurs when the by-pass valve changes over in a predetermined short time interval as shown in FIG. 11C. This leads to valve noise, the durability of the by-pass valve declines, and thermal fatigue of the catalyst easily develops depending on temperature fluctuations.

To prevent hunting, the threshold value B may be brought down to the threshold value C to make the hysteresis large.

In this case however, when the by-pass valve is changed over to the position which by-passes the upstream catalytic converter, a considerable time delay occurs until the by-pass valve changes over again even when the engine load subsequently changes from region II to region I. During this time delay, purification of exhaust by the upstream catalytic converter does not of course take place. In view of the fact that the role of the upstream catalytic converter is to purify exhaust in region I, there would therefore seem to be no reason for providing the upstream converter.

SUMMARY OF THE INVENTION

It is therefore an object of this invention to prevent the hunting without increasing hysteresis.

It is another object of this invention to improve the detection or estimation precision of catalyst temperature which is a basis for a change-over of by-pass valve.

In order to achieve the above objects, this invention provides an exhaust purifier for an engine comprising an exhaust passage connected to the engine for expelling exhaust of the engine, an upstream catalytic converter disposed in the exhaust passage, a downstream catalytic converter disposed downstream of the upstream catalytic converter in the exhaust passage, a by-pass passage for by-passing the upstream converter, a mechanism for selectively connecting a flow of exhaust to the converter and the by-pass passage, a mechanism for detecting a running state of the engine, a mechanism for detecting a catalyst temperature of the upstream catalytic converter, a first mechanism for controlling the selecting mechanism such that exhaust is routed to the by-pass passage when the catalyst temperature exceeds a threshold value A, a mechanism for storing the catalyst temperature when exhaust is routed to the by-pass passage and the engine is in a steady running state as a convergence temperature according to the running state of the engine, and a second mechanism for controlling the selecting mechanism such that exhaust is routed to the upstream converter when exhaust has been routed to the by-pass passage, and both the catalyst temperature and the convergence temperature corresponding to the running state at that time are less than a threshold value B which is less than the threshold value A.

It is preferable that the running state detecting mechanism comprises a mechanism for detecting a rotation speed of the engine and a mechanism for detecting a load of the engine, and the storage mechanism comprises a map in which convergence temperatures are assigned according to the rotation speed and the load.

It is also preferable that the purifier further comprises a mechanism for determining whether or not the engine is running in the steady running state, a mechanism for determining whether or not the catalyst temperature has converged, and a mechanism for updating the convergence temperature stored in the storage mechanism by the catalyst temperature in a state when exhaust is routed to the upstream catalytic converter and the catalyst temperature has converged in the steady running state.

The running state detecting mechanism may for example comprises a mechanism for detecting a load of the engine and the steady state determining mechanism comprises a mechanism for determining whether or not a variation amount of the rotation speed is less than a predetermined value C, a mechanism for determining whether or not a variation amount of the load is less than a predetermined value D, and a mechanism for determining that the engine is in the steady state when the rotation speed variation amount is less than the predetermined value C and the load variation amount is less than the predetermined value D.

The convergence determining mechanism may for example comprises a mechanism for determining whether or not a variation amount of the catalyst temperature is less than a predetermined value E and a mechanism for determining whether or not a state where the variation amount is less than the predetermined value D has continued for a predetermined time, and the convergence determining mechanism determines that the catalyst temperature has converged when the state in which the variation amount is less than the predetermined value D continues for the predetermined time.

It is also preferable that the catalyst temperature detecting mechanism comprises a sensor for detecting a temperature of a catalyst bed supporting the catalyst in the upstream catalytic converter.

It is also preferable that the running state detecting mechanism comprises a mechanism for detecting a rotation speed of the engine and a mechanism for detecting a load of the engine, and the catalyst temperature detecting mechanism estimates the catalyst temperature based on the rotation speed, the load and the convergence temperature.

In this case, the catalyst temperature detecting mechanism may estimate the catalyst temperature by different processes under a first condition when the exhaust is routed to the upstream converter and under a second condition when the exhaust is routed to the by-pass passage.

Further, the storage mechanism may comprise a first convergence temperature map suited to the first condition and a second convergence temperature map suited to the second condition, and the catalyst temperature detecting mechanism estimates the catalyst temperature using the first map under the first condition, and estimates the catalyst temperature using the second map under the second condition.

If the engine is mounted on an automobile, the running state detecting mechanism may further comprises a mechanism for detecting a travel speed of the automobile, and the catalyst temperature detecting mechanism comprises a mechanism for correcting the catalyst temperature estimated by the catalyst temperature detecting mechanism based on the travel speed.

In this case, the catalyst temperature detecting mechanism may further comprise a mechanism for performing first order delay processing based on a heat transfer coefficient between the exhaust and the catalyst in the upstream catalytic converter and on a heat conductance coefficient of a bed supporting the catalyst in the upstream catalytic converter.

The details as well as other features and advantages of this invention are set forth in the remainder of the specification and are shown in the accompanying drawings.

BRIEF DESCRIPTION OF THE DRAWINGS

FIGS. 11A–11C are similar to FIGS. 4A–4B, but showing control results according to the prior art.

DETAILED DESCRIPTION OF THE PREFERRED EMBODIMENTS

Figure 1:
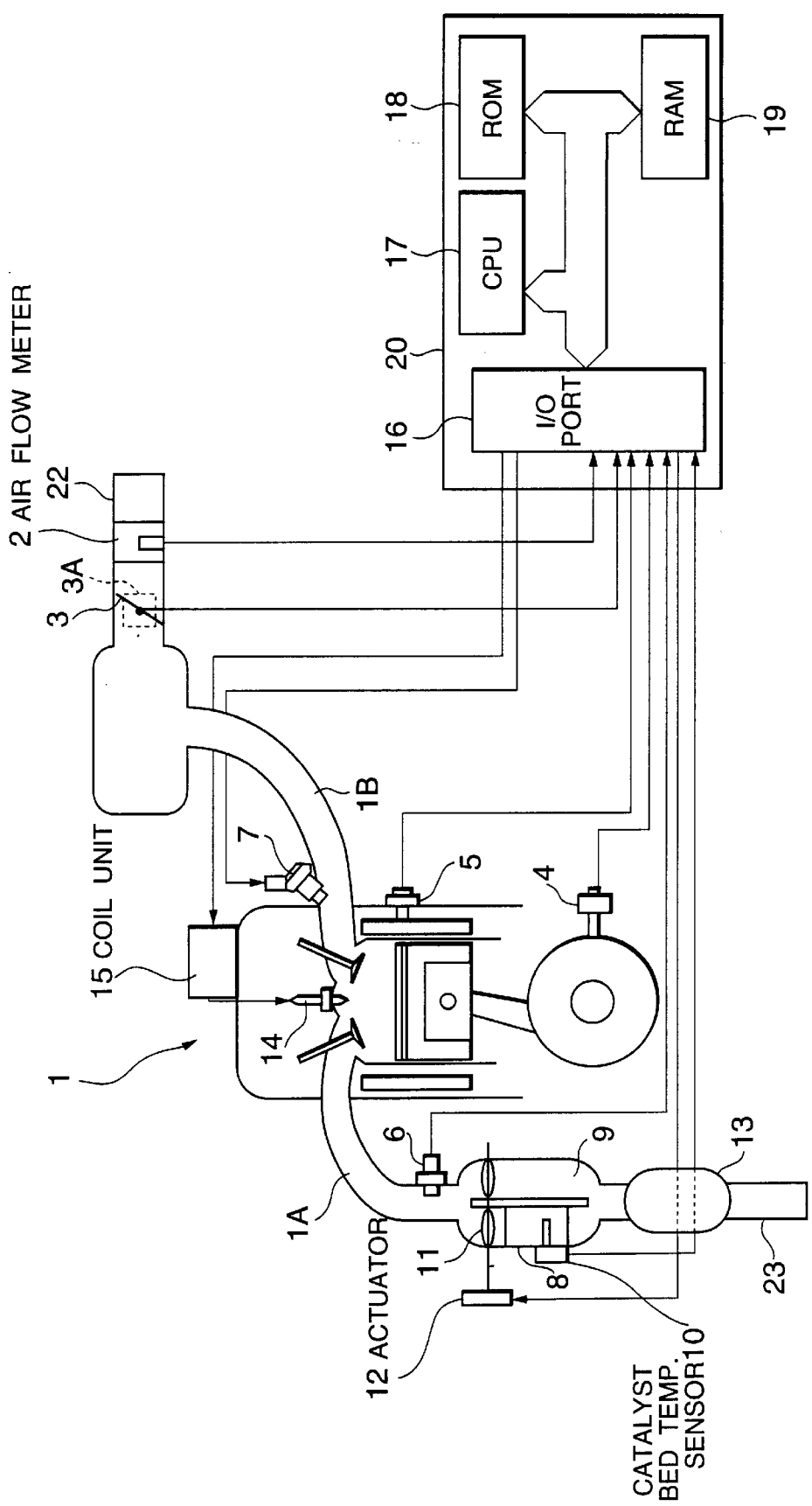
FIG. 1 is a schematic diagram of an exhaust purifier according to this invention.

Referring to FIG. 1 of the drawings, an automobile engine 1 aspirates air into each cylinder via an intake passage 22 and an intake manifold 1A. The intake passage 22 is provided with an air flow meter 2 which detects an intake air flowrate Qa and a throttle 3 which varies the intake air flowrate Qa according to an accelerator pedal, not shown.

A fuel injector 7 for injecting fuel into the intake air is provided in each branch pipe of the manifold 1A.

The fuel, which is aspirated as an air-fuel mixture with air by each of the cylinders of the engine 1, is ignited by a spark of a spark plug 14 and burns. Combustion gases are discharged from an exhaust manifold 1A via an exhaust passage 23. Two catalytic converters 8 and 13 for purifying exhaust are arranged in series in the exhaust passage. The catalytic converters comprise exhaust purifying catalysts such as a three-way catalyst, a lean NOx catalyst and an oxidizing catalyst. The downstream catalytic converter 13 is the main catalytic converter which normally circulates exhaust gas. The upstream catalytic converter 8 is arranged in parallel with the by-pass passage 9 in the same housing.

At the inlet to this housing, a by-pass valve unit 11 comprising two by-pass valves selectively routes exhaust gas to the converter 8 and the by-pass passage 9. The unit 11 is driven by an actuator 12 in response to a drive signal from a control unit 20, and it is set in either of two positions, i.e. an L position which leads exhaust gas from the exhaust manifold 1A to the converter 8, and a position H which leads exhaust gas to the by-pass passage 9. The control unit 20 consists of a microcomputer provided with an I/O port 16, CPU17, ROM18, RAM19 and an A/D converter, not shown.

The CPU 17 reads data from external sources necessary for control of the by-pass valve unit 11 via the I/O port 16 according to program stored in the ROM18. The CPU 17 performs computations required for control while exchanging data with the RAM 19, and a drive signal is output to an actuator via the I/O port 16.

The ROM18 stores programs for controlling the CPU17, and also stores data used in computations, for example in the form of maps.

The control unit 20 controls not only the by-pass valve 11, but also the fuel injector 7, an ignitor of the spark plug 14 and a coil unit 15 by output signals via the I/O port 16.

The fuel injector 7 injects a fuel amount corresponding to a pulse width of an output signal from the control unit 20. The ignitor and spark plug fire the spark plug 14 according to the output timing of an output signal from the control unit 20, and fuel is burnt in the cylinder.

Signals from various sensors are input to the control unit 20 to perform the above control. These sensors include the air flow meter 2, a throttle opening sensor 3A which detects an opening TVO of the throttle 3, a crank angle sensor 4 which detects an engine crank angle and rotation speed, a water temperature sensor 5 which detects an engine cooling water temperature Tw, an air-fuel ratio sensor 6 which detects the air-fuel ratio of the fuel mixture supplied to the engine 1, and a catalyst bed temperature sensor 10 which detects the temperature of the catalyst bed supporting the catalyst in the converter 8.

Based on these input signals, the control unit 20 changes over the by-pass valve unit 11. To summarize the control which is performed, the control unit 1 calculates the variation of engine running conditions such as engine rotation speed or load and of temperature detected by the temperature sensor 10 at a predetermined time interval.

When these variations do not exceed predetermined limits, it is determined that the catalyst temperature has converged under steady state running conditions. The combination of temperature detected by the temperature sensor 10 at that time and the running conditions is stored as a steady state converged temperature.

At the same time as the aforesaid routine, when the temperature detected by the catalyst bed temperature sensor 10 exceeds a set threshold value A, the by-pass valve unit 11 changes over to the H position, and exhaust from the exhaust manifold 1A is led to the by-pass passage 9 without passing through the catalytic converter 8. In this way, the catalyst in the catalytic converter is protected from deterioration due to high temperature.

At this time, the catalyst in the downstream catalytic converter 13 is sufficiently heated and active, so adequate exhaust purification can be obtained using only the converter 13 without using the converter 8.

The situation when the by-pass valve unit 11 is set to the H position continues until both the steady state convergence temperature corresponding to present running conditions and the catalyst bed temperature detected by the temperature sensor 10 have fallen to less than a threshold value B which is smaller than the threshold value A.

When both the steady state convergence temperature and the catalyst bed temperature are less than the threshold value B, the by-pass valve unit 11 again changes over from the H position to the L position, the by-pass passage 9 is closed, and exhaust from the exhaust manifold 1A is led to the catalytic converter 8.

Figure 2A:
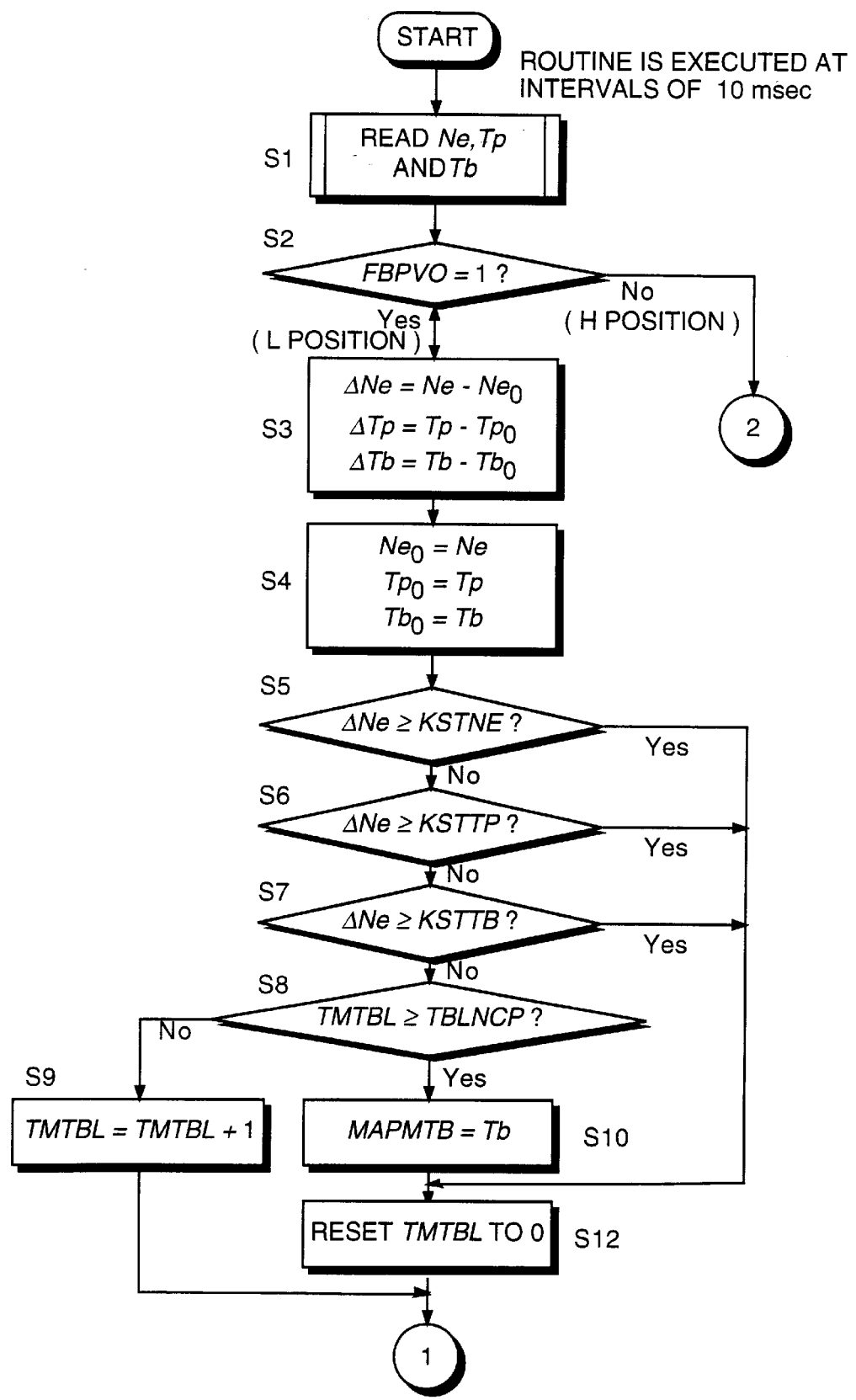
FIGS. 2A and 2B are flowcharts for describing a by-pass valve change-over control routine according to this invention.

The aforesaid routine will now be described in detail with reference to the flowcharts of FIGS. 2A and 2B.

This routine is executed at predetermined intervals of, e.g. 10 msec.

In a step S1, the control unit 20 first reads the engine rotation speed Ne, engine load Tp, and catalyst bed temperature Tb detected by the catalyst bed temperature sensor 10.

The engine load Tp is a value corresponding to the basic fuel injection amount of the fuel injector 7. This data is obtained from a fuel injection control routine executed separately, alternatively it is found from an intake air amount Qa detected by the air flow meter 2 or from the throttle opening TVO detected by the throttle opening sensor 3A. The concept of basic fuel injection amount is discussed in, for example, U.S. Pat. No. 5,345,921.

In a step S2, it is determined whether a position flag FBPVO showing the position of the by-pass valve unit 11 is 1 or 0. This is set in steps S18 and S20 described later. FBPVO=1 indicates that the by-pass valve unit 11 is set to the L position, i.e. that exhaust is flowing into the upstream catalytic converter 8. FBPVO=0 indicates that the by-pass valve unit 11 is set to the H position, i.e. that exhaust is flowing into the by-pass passage 9.

The by-pass valve unit 11 and position flag FBPVO are respectively initialized to L position and FBPVO=1 each time the automobile ignition switch is switched ON by a separate initialization routine.

In the step S2, when FBPVO=1, the routine proceeds to a step S3, and when FBPVO=0 the routine proceeds to a step S10.

In the step S3, variation amounts $\Delta Ne$, $\Delta Tp$ and $\Delta Tb$ of the engine rotation speed Ne, engine load Tp and catalyst bed temperature Tb from the immediately preceding occasion when the routine was executed are calculated from the following equations:

$$\Delta Ne = Ne - Ne_0 \qquad (1)$$

$$\Delta Tp = Tp - Tp_0 \qquad (2)$$

$$\Delta Tb = Tb - Tb_0 \qquad (3)$$

where, $Ne_0$ is the value of Ne on the immediately preceding occasion when the routine was performed, $Tp_0$ is the value of Tp on the immediately preceding occasion when the routine was performed, and $Tb_0$ is the value of Tb on the immediately preceding occasion when the routine was performed.

In a step S4, the values of Ne, Tp, Tb which were read in the present routine are respectively stored as $Ne_0$, $Tp_0$, $Tb_0$.

In steps S5–S7, it is determined whether or not the engine is under steady state running conditions based on the calculated $\Delta Ne$, $\Delta Tp$ and $\Delta Tb$.

First, in a step S5, $\Delta Ne$ is compared with a preset engine rotation speed steady state determination threshold value KSTNE. When $\Delta Ne < KSTNE$ the routine proceeds to a step S6, and when $\Delta Ne \geq KSTNE$ the routine proceeds to a step S12.

In the step S6, $\Delta Tp$ is compared with a preset engine load steady state determination threshold value KSTTP. When ΔNe≧KSTTP, the routine proceeds to a step S7, and when ΔNe≧KSTTP, the routine proceeds to the step S12.

In a step S7, ΔTb is compared with a preset engine rotation speed steady state determination threshold value KSTTB. When ΔNe<KSTTB, the routine proceeds to a step S8, and when ΔNe≧KSTTB, the routine proceeds to the step S12.

In other words, in the determinations of the steps S5–S7, the routine proceeds to the step S8 only when the values of ΔNe, ΔTp and ΔTb are all less than threshold values.

In the step S8, the time for which the values of ΔNe, ΔTp and ΔTb are all less than threshold values is compared with a timer value TMTBL, and with a predetermined updating permission time TBLNCP.

When TMTBL<TBLNCP, the steady state running continues for less than a predetermined time. In this case, the timer value TMTBL is incremented in a step S9.

When TMTBL≧TBLNCP, the steady state running time reaches the predetermined time. In this case, it is determined that the present catalyst bed temperature Tb has converged under given steady state running conditions, and in a step S10, the catalyst bed temperature Tb is read as a learned value MTb in a corresponding column of a map of steady state catalyst bed temperatures. When a learned value MTb is already written in the column, this value is updated. Subsequently, the timer value TMTBL is reset to 0 in the step S12.

When any of ΔNe, ΔTp or ΔTb exceed the threshold values in the steps S5–S7, the timer value TMTBL is directly reset to 0 in the step S12.

Figure 3:
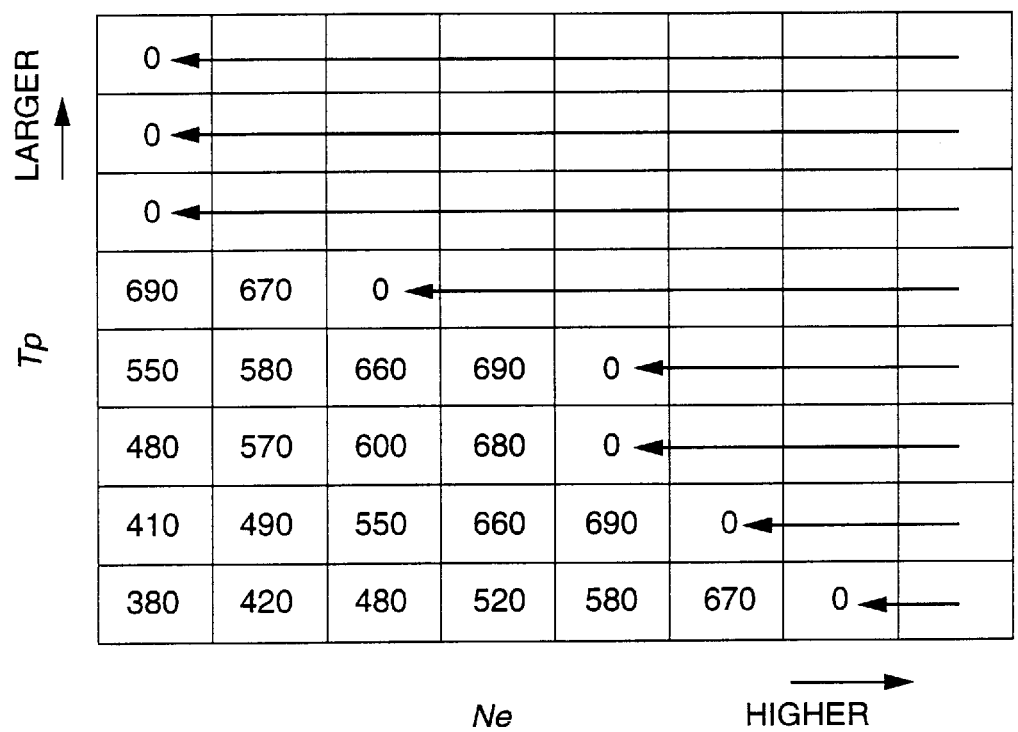
FIG. 3 is a map of steady state catalyst bed temperatures stored in a control unit of the exhaust purifier.

The map of steady state catalyst bed temperatures is drawn up with engine rotation speed Ne and engine load Tp as parameters, as shown in FIG. 3. Hence, in the step S10, the present catalyst bed temperature Tb is written as the learned value MTb of steady state catalyst bed temperature corresponding to the present engine rotation speed Ne and engine load Tp. This map is stored in a backup memory directly supplied by the vehicle battery, irrespective of the position of the ignition switch, even when the engine 1 has stopped. There is therefore no need to rewrite it each time the ignition switch is switched ON.

Figure 2B:
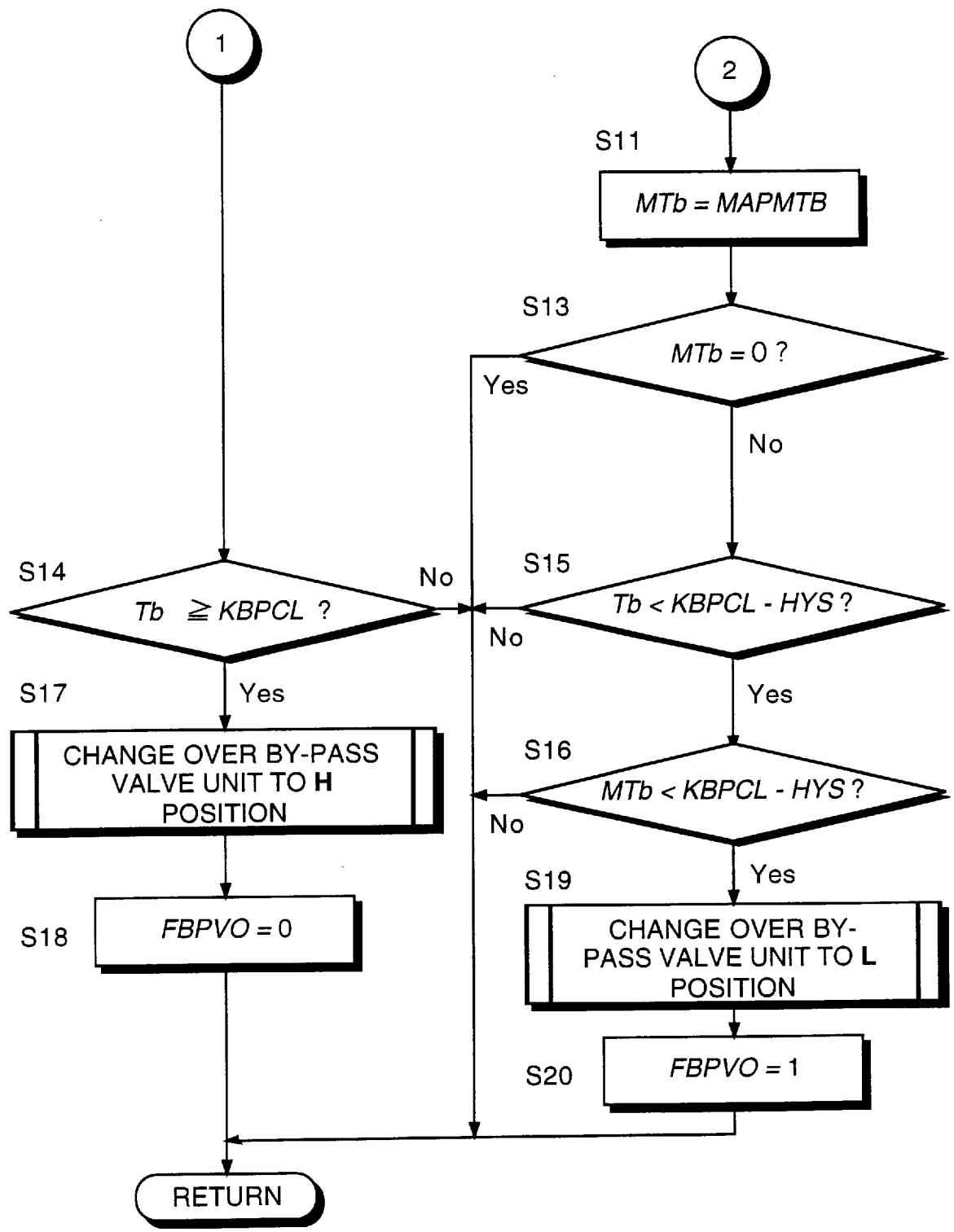

The timer value TMTBL is incremented in the step S9 or after it is reset to 0 in the step S12, the routine proceeds to a step S14 in FIG. 2B. Here, the catalyst bed temperature Tb is compared with a protection temperature KBPCL corresponding to the aforesaid threshold value A.

When the catalyst bed temperature Tb is equal to or greater than the protection temperature KBPCL, the by-pass valve unit 11 is changed over to the H position in a step S17, and exhaust is led into the exhaust passage 9. The position flag FBPVO is also reset to 0 which indicates the H position in a step S18, and the routine ends. Hence, in an engine running region where the catalyst bed temperature exceeds the protection temperature KBPCL before the catalyst bed temperature Tb converges, the timer value TMTBL never reaches the predetermined time TBLNCP in the step S8, so the corresponding column of the map is always 0 as shown in FIG. 3.

When the catalyst bed temperature Tb does not reach the protection temperature KBPCL in the step S14, exhaust can still continue to be led into the catalytic converter 8. In this case, the routine is terminated without completing the processing of the steps S18 and S19.

However, when FBPVO=0 in the determination of the step S2, i.e. when the by-pass valve unit 11 is set to the H position and exhaust is led to the by-pass passage 9, the processing of the step S11 of FIG. 2B is performed after the step S2.

In the step S11, the learned value MTb of the steady state catalyst bed temperature is searched from the map of steady state catalyst bed temperatures based on the detected engine rotation speed Ne and engine load Tp.

In the step S13, it is determined whether or not this learned value MTb is 0.

When MTb=0, the steady state catalyst bed temperature exceeds the protection temperature KBPCL as described hereinabove. In this case, as the conditions for releasing catalyst protection of the catalytic converter 8 are not established, the routine ends and the by-pass valve unit 11 is kept in the H position.

When the learned value MTb is not 0 in the step S13, the catalyst bed temperature Tb is compared with (KBPCL–HYS) in a step S15. HYS is the hysteresis for release of catalyst protection, and (KBPCL–HYS) corresponds to the aforesaid threshold value B.

When Tb≧(KBPCL–HYS), the conditions for releasing catalyst protection are still not established, so the routine ends so as to keep the by-pass valve unit 11 in the H position.

When Tb<(KBPCL–HYS), MTb and (KBPCL–HYS) are compared in a step S16.

When MTb≧(KBPCL–HYS), the conditions for releasing catalyst protection are still not established, so the routine ends so as to keep the by-pass valve unit 11 in the H position.

When MTb<(KBPCL–HYS), both the catalyst bed temperature Tb and the learned value MTb of the steady state catalyst bed temperature are lower than the threshold value B, so the catalyst temperature steadily falls and it is determined that there is no need for protection.

In this case, the by-pass valve unit 11 is changed over to the L position in which exhaust is led to the catalytic converter 8, in a step S19. Further, the position flag FBPVO is reset to 1 indicating the L position in a step S20, and the routine ends.

As this device detects catalyst bed temperature as described hereinabove, a more precise catalyst temperature is detected than when catalyst temperature is detected from the exhaust temperature, etc.

Figure 4:
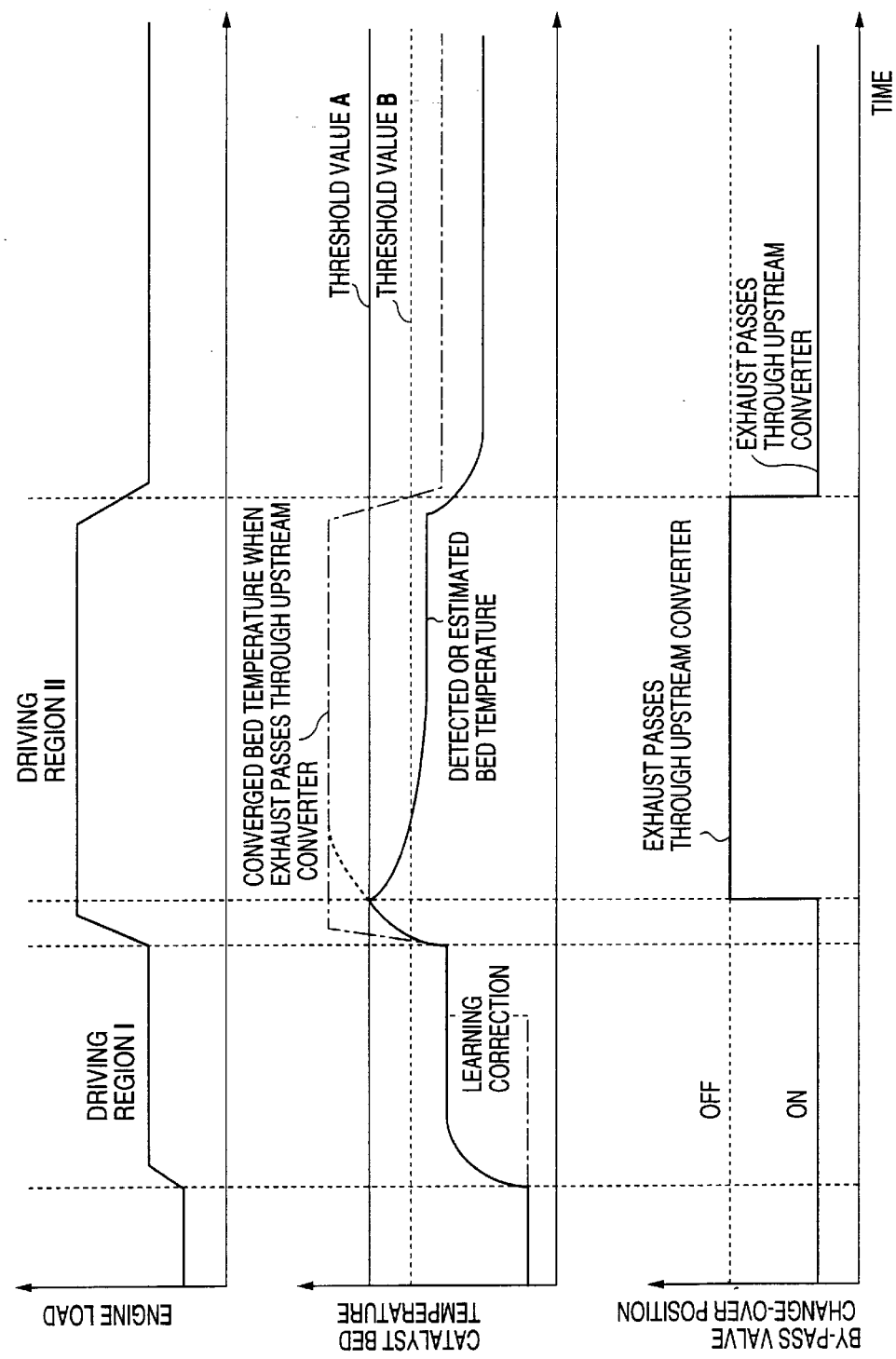
FIGS. 4A–4C are timing charts showing variations of engine load, catalyst bed temperature and by-pass valve drive signals as a result of the by-pass valve change-over control routine.

Moreover, the device learns the catalyst bed temperature during steady running under each set of running conditions when the by-pass valve unit 11 is set to the L position, and the catalyst is not reused until both this learned value MTb searched from the map based on the detected engine rotation speed Ne and engine load Tp, and the catalyst bed temperature Tb have fallen to below the threshold value B as shown in FIG. 4B.

Hence in the driving region II shown in FIG. 4A, the by-pass valve unit 11 is always set to the H position as shown in FIG. 4C, and it is not necessary to make the hysteresis of the change-over conditions of the by-pass valve unit 11 large in order to suppress hunting.

FIGS. 5–10 show a second embodiment of this invention.

Figure 5:
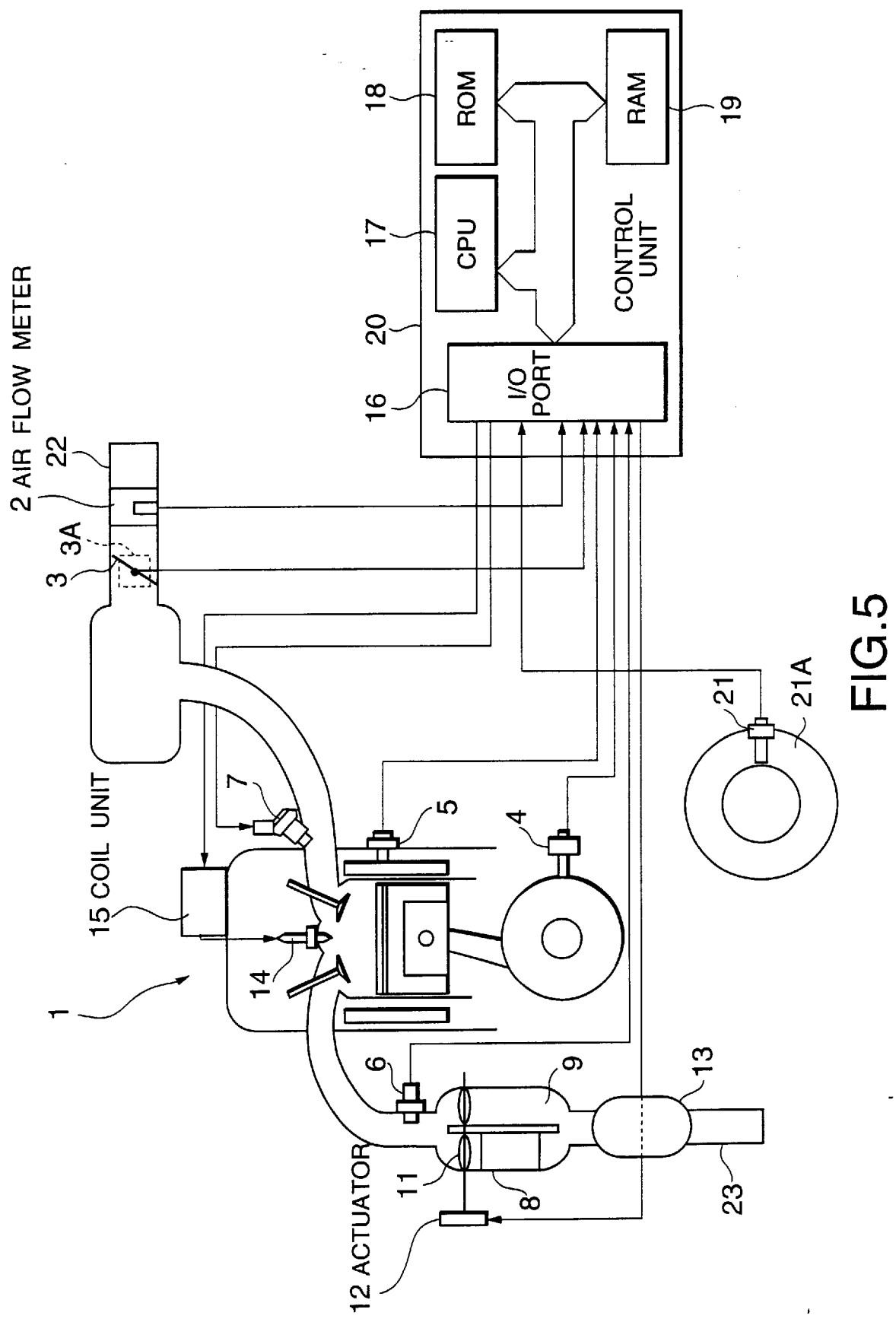
FIG. 5 is a schematic diagram of an exhaust purifier according to a second embodiment of this invention.

According to this second embodiment, a vehicle speed sensor 21 is provided which detects a vehicle speed VSP from a rotation speed of a wheel 21A of the automobile, and the catalyst bed temperature sensor 10 is omitted, as shown in FIG. 5.

Other parts of the construction are identical to those of FIG. 1.

Figure 6A:
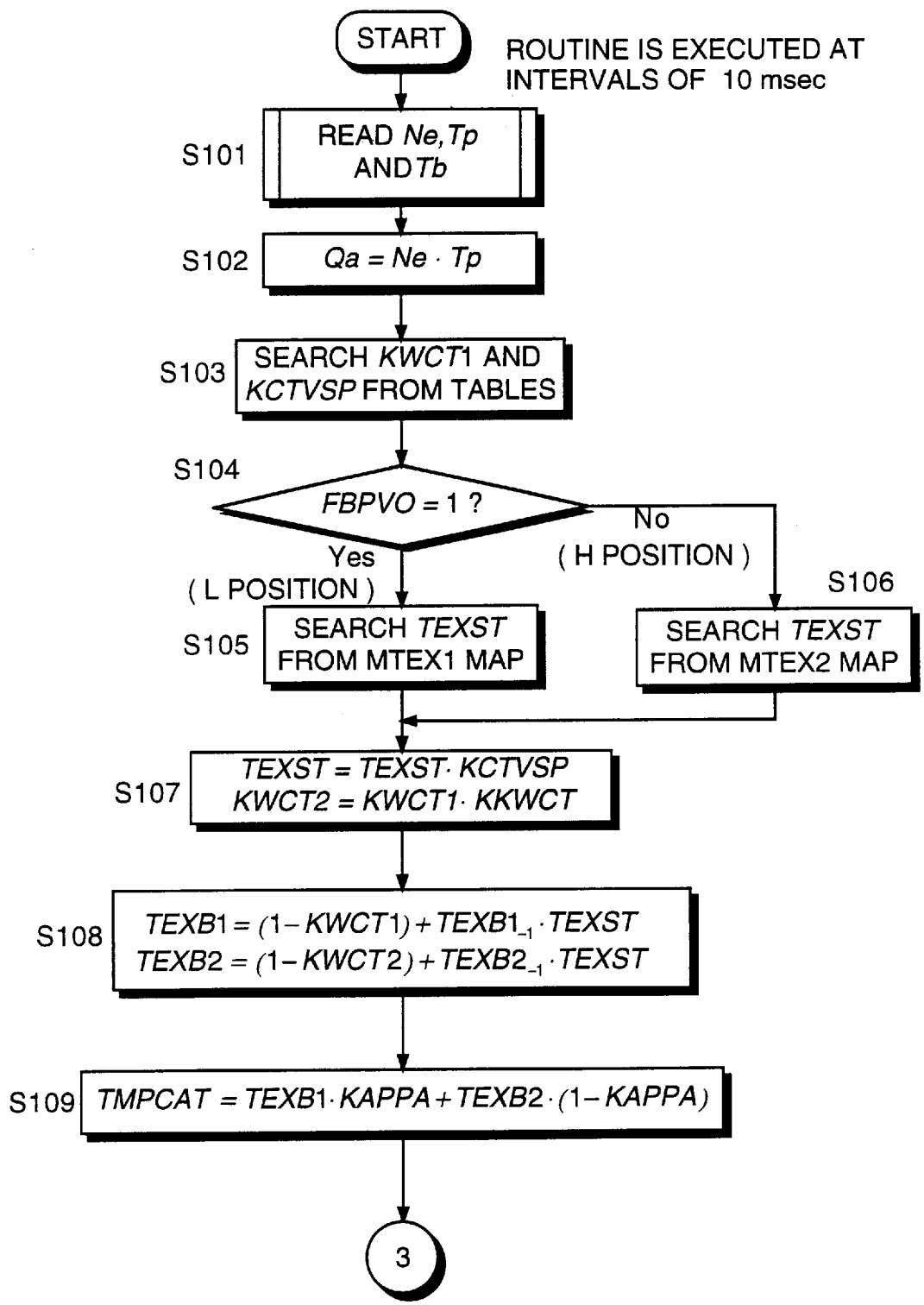
FIGS. 6A and 6B are flowcharts describing a by-pass change-over control routine according to the second embodiment.
Figure 6B:
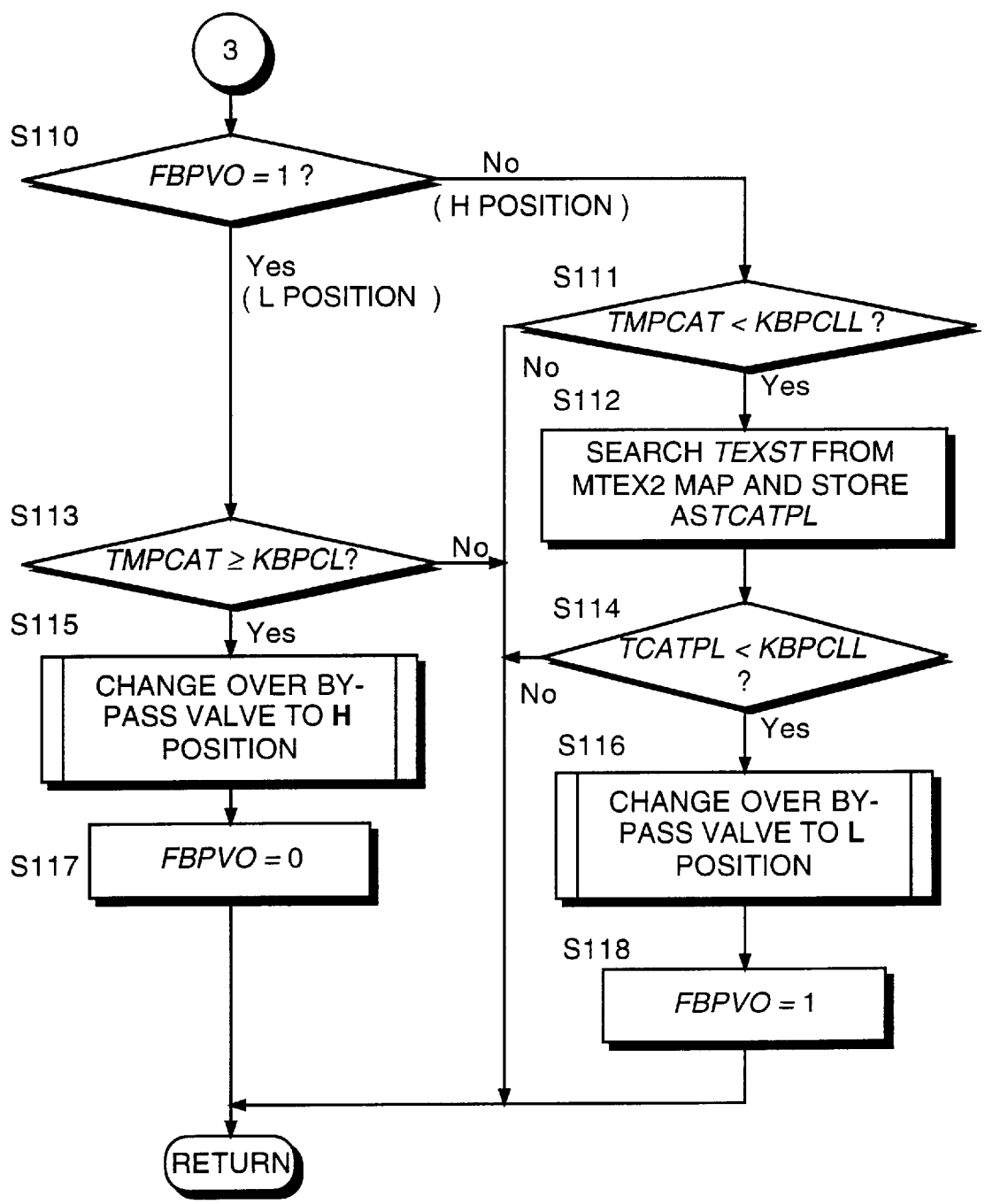

According to this embodiment, the control unit 20 controls the by-pass valve unit 11 according to a routine shown in FIGS. 6A and 6B. This process is executed at predetermined intervals of, e.g. 10 ms.

First, the engine rotation speed Ne, engine load Tp and vehicle speed VSP are read in a step S101.

In a step S102, an intake air flowrate Qa is calculated from the product of Ne and Tp. Qa may be found from a signal output by the air flow meter 2.

Figure 7:
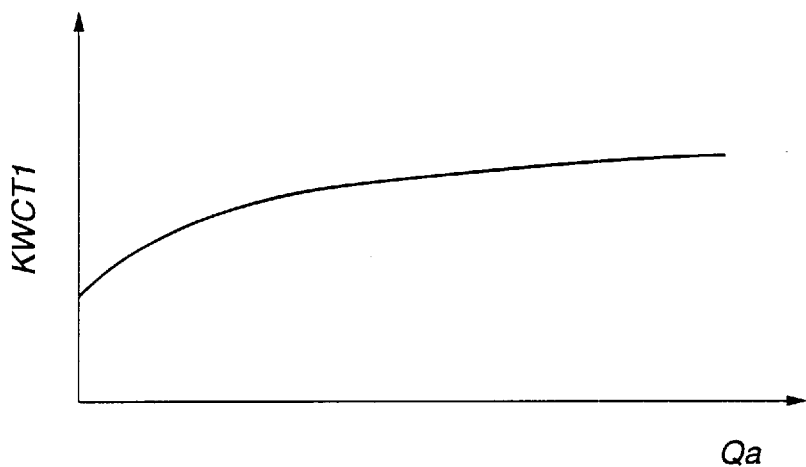
FIG. 7 is a graph showing the characteristics of a table of heat transfer coefficients KWCT1 stored in a control unit according to the second embodiment.

In a step S103, a heat transfer coefficient KWCT1 is searched from a table of heat transfer coefficients stored in a ROM 18 based on the intake air flowrate Qa. A travel wind correction coefficient KCTVSP is also searched from a table of travel wind correction coefficients stored in the ROM 18 based on VSP/Qa. The heat transfer coefficient table is set so as to give a larger heat transfer coefficient KWCT1 the larger the intake air flowrate Qa of the engine 1 as shown in FIG. 7.

As the exhaust flowrate can be calculated from the intake air flowrate Qa, the relation between exhaust flowrate and heat transfer coefficient KWCT1 which has an even more direct correlation than the relation between the intake air flowrate Qa and heat transfer coefficient KWCT1, may also be set as a table.

Figure 8:
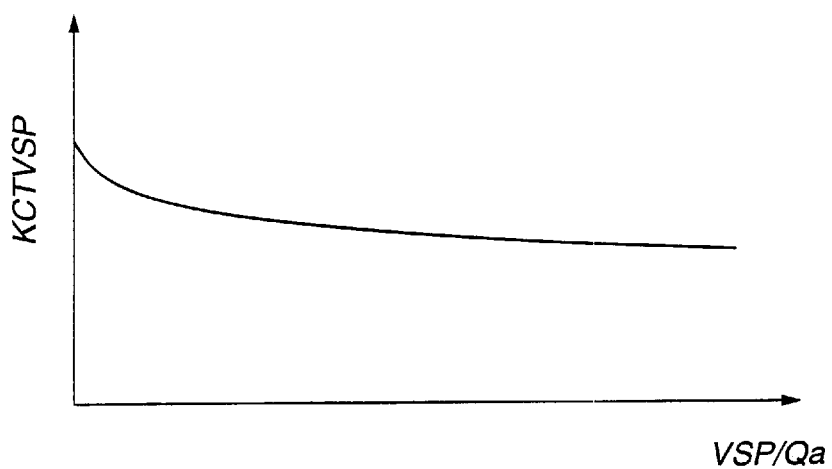
FIG. 8 is a graph showing the characteristics of a table of traveling wind compensation coefficients TKVSP stored in the control unit according to the second embodiment.

The table of travel wind correction coefficient is set so as to give a smaller travel wind correction coefficient KCTVSP the larger is VSP/Qa as shown in FIG. 8.

In a step S104, the determination of the flag FBPVO is performed.

Figure 9:
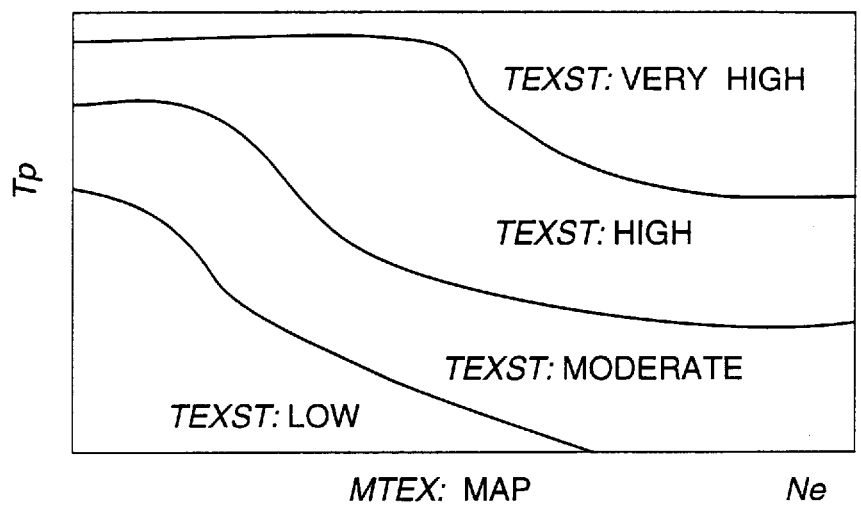
FIG. 9 is a map MTEX1 of estimated convergence temperatures TEXST of a catalyst when an upstream catalytic converter is used, stored in the control unit according to the second embodiment.

When FBPVO=1, i.e. when exhaust is routed to the upstream catalytic converter 8, an estimated catalyst steady state convergence temperature TEXST is searched from a map MTEX1 shown in FIG. 9 which is previously stored in the ROM 18 of the control unit 20, based on the engine rotation speed Ne and engine load Tp, in a step S105.

Figure 10:
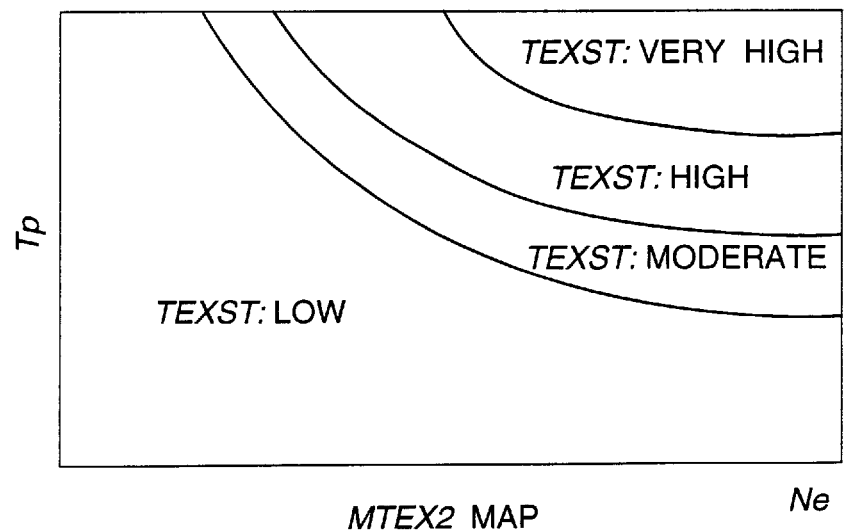
FIG. 10 is a map MTEX2 of estimated convergence temperatures TEXST of the catalyst when the upstream catalytic converter is not used, stored in the control unit according to the second embodiment.

When FBPVO=0, i.e. when exhaust is not routed to the upstream catalytic converter 8, the estimated catalyst steady state convergence temperature TEXST is searched from a map MTEX2 shown in FIG. 10 which is previously stored in the ROM 18 of the control unit 20, based on the engine rotation speed Ne and engine load Tp, in a step S106.

These maps are prepared by experimentally determining the catalyst bed convergence temperatures, during steady state running, for the separate cases when exhaust is routed to the upstream catalytic converter 8 and when it is not.

In a step S107, the estimated catalyst steady state convergence temperature TEXST is corrected by the travel wind correction coefficient KCTVSP, and the corrected value is stored as a new estimated catalyst steady state convergence temperature TEXST.

In this way, the effect of travel wind is reflected in the estimated catalyst steady state convergence temperature TEXST.

A heat conduction coefficient KWCT2 is also calculated by multiplying the heat transfer coefficient KWCT1 by a heat transfer-heat conduction conversion coefficient KKWCT. These coefficients will now be described.

Broadly speaking, exhaust heat is transferred to the catalyst bed in the following two modes.

1. Heat from exhaust circulating in the interior of the catalytic converter is directly transferred to the catalyst bed.
2. Heat transferred from exhaust to the housing of the catalytic converter is conducted to the catalyst inside the converter.

Herein, the heat transfer coefficient KWCT1 is a time constant when the catalyst causes a temperature change due to the former transfer mode. The heat transfer coefficient KWCT2 is a time constant when the catalyst causes a temperature change due to the latter transfer mode.

When heat transferred by the former mode is large, heat transferred by the latter mode is also large, and KWCT1, KWCT2 are effectively in direct proportion.

Hence, KWCT2 can be found from KWCT1 by using the heat transfer-heat conduction conversion coefficient KKWCT. The aforesaid direct heat transfer and heat conduction occur together, however the proportion of the total heat transfer represented by each varies depending on the shape of the housing. This proportion is represented by a proportion coefficient KAPPA described hereafter. These coefficients are previously found by experiment.

In a step S108, a catalyst temperature term TEXB1 due to direct heat transfer and a catalyst temperature term TEXB2 due to heat conduction, are respectively calculated by the following equations.

$$TEXB1 = (1-KWCT1) + TEXB1_{-1} \cdot TEXST \quad (4)$$

$$TEXB2 = (1-KWCT2) + TEXB2_{-1} \cdot TEXST \quad (5)$$

$TEXB1_{-1}$ is the immediately preceding value of TEXB1, and $TEXB2_{-1}$ is the immediately preceding value of TEXB2.

In a step S109, an estimated catalyst bed temperature TMPCAT is calculated by the following first order delay equation based on the data found by the aforesaid calculations, where KAPPA=proportionality coefficient.

$$TMPCAT = TEXB1 \cdot KAPPA + TEXB2 \cdot (1-KAPPA) \quad (6)$$

The catalyst bed temperature may be estimated with high precision by the above steps S105–S109. Also, the catalyst temperature shift may be precisely estimated at any time by this first order processing regardless of the driving state history of the vehicle.

In a step S110, the position flag FBPVO is again determined.

When FBPVO is 1, i.e. when exhaust is introduced in the catalytic converter 8, it is determined, in a step S113, whether or not the estimated catalyst bed temperature TMPCAT is equal to or greater than the protection temperature KBPCL corresponding to the aforesaid threshold value A.

When TMPCAT≧KBPCL, the by-pass valve unit 11 is changed over to the H position in a step S115, introduction of exhaust in the catalytic converter 8 is interrupted, and exhaust is led to the by-pass passage 9.

Further, in a step S117, FBPVO is set to 0 and the routine ends.

When TMPCAT<KBPCL in the step S113, the estimated catalyst bed temperature is low and there is no risk of catalyst heat deterioration.

In this case the routine is terminated so the by-pass valve 11 remains in the L position.

On the other hand when FBPVO=0 in the step S110, i.e. when exhaust is not routed to the catalytic converter 8 but is routed to the exhaust passage 9, the estimated catalyst bed temperature TMPCAT and the protection release temperature KBPCL corresponding to the aforesaid threshold value B are compared in a step S111.

When TMPCAT≧KBPCLL, as catalyst protection is still required, the routine is terminated so that the by-pass valve unit 11 is kept in the H position.

When TMPCAT<KBPCLL, in a step S112, the estimated catalyst steady state convergence temperature TEXST is searched from the map MTEX2 based on the engine rotation speed Ne and the engine load Tp, and this is stored as TCATPL.

TCATPL and the protection release temperature KBPCLL are compared in the step S113.

When TCATPL<KBPCLL, both the catalyst bed temperature and estimated catalyst steady state convergence temperature are less than the threshold value B. It is therefore determined that catalyst protection is no longer necessary, and the by-pass valve unit 11 is changed over to the L position in a step S116. As a result, the by-pass passage 9 is closed, and exhaust is again led into the catalytic converter 8. Also, FBPVO is set to 1 in a step S118, and the routine ends.

When TCATPL≧KBPCLL, as the decrease of catalyst temperature is insufficient the routine is terminated, so the by-pass valve unit 11 is kept in the H position.

According also to this embodiment, unless both the estimated catalyst bed temperature and estimated catalyst steady state convergence temperature are less than the threshold value, supply of exhaust to the catalytic converter is not restarted, so even when the protection release temperature KBPCLL is not set particularly low, hunting of the by-pass valve unit change-over 11 does not occur.

According to this embodiment, maps of the steady sate convergence temperature TEXST are previously stored for the cases when the upstream catalytic converter is used and when it is not, and the catalyst bed temperature TMPCAT is estimated from the stored steady state convergence temperature TEXST. The catalyst temperature when exhaust is not routed to the upstream catalytic converter 8 can therefore also be estimated with high precision.

Further, there is not variation in the accuracy of calculating the steady state convergence temperature according to the degree of learning as in the aforesaid first embodiment, and as the catalyst bed temperature sensor is not used, the control precision does not decline due to temporal deterioration of the sensor.

The embodiments of this invention in which an exclusive property or privilege is claimed are defined as follows:

1. An exhaust purifier for an engine comprising:

an exhaust passage connected to said engine for expelling exhaust of the engine, an upstream catalytic converter disposed in said exhaust passage, a downstream catalytic converter disposed downstream of said upstream catalytic converter in said exhaust passage, a by-pass passage for by-passing the upstream converter, means for selectively connecting a flow of exhaust to said converter and said by-pass passage, means for detecting a running state of said engine, means for detecting a catalyst temperature of said upstream catalytic converter, first means for controlling said selecting means such that exhaust is routed to said by-pass passage when said catalyst temperature exceeds a threshold value A, means for storing said catalyst temperature when exhaust is routed to said by-pass passage and said engine is in a steady running state as a convergence temperature according to the running state of said engine, and second means for controlling said selecting means such that exhaust is routed to said upstream converter when exhaust has been routed to said by-pass passage, and both said catalyst temperature and said convergence temperature corresponding to the running state at that time are less than a threshold value B which is less than the threshold value A.

2. An exhaust purifier as defined in claim 1, wherein said running state detecting means comprises means for detecting a rotation speed of said engine and means for detecting a load of said engine, and said storage means comprises a map in which convergence temperatures are assigned according to said rotation speed and said load.

3. An exhaust purifier as defined in claim 1, further comprising means for determining whether or not said engine is running in the steady running state, means for determining whether or not said catalyst temperature has converged, and means for updating said convergence temperature stored in said storage means by said catalyst temperature in a state when exhaust is routed to said upstream catalytic converter and said catalyst temperature has converged in the steady running state.

4. An exhaust purifier as defined in claim 3, wherein said running state detecting means comprises means for detecting a load of said engine, said steady state determining means comprises means for determining whether or not a variation amount of said rotation speed is less than a predetermined value C, means for determining whether or not a variation amount of said load is less than a predetermined value D, and means for determining that said engine is in said steady state when said rotation speed variation amount is less than said predetermined value C and said load variation amount is less than said predetermined value D.

5. An exhaust purifier as defined in claim 3, wherein said convergence determining means comprises means for determining whether or not a variation amount of said catalyst temperature is less than a predetermined value E and means for determining whether or not a state where said variation amount is less than said predetermined value D has continued for a predetermined time, and determines that said catalyst temperature has converged when said state in which the variation amount is less than said predetermined value D continues for said predetermined time.

6. An exhaust purifier as defined in claim 1, wherein said catalyst temperature detecting means comprises a sensor for detecting a temperature of a catalyst bed supporting the catalyst in said upstream catalytic converter.

7. An exhaust purifier as defined in claim 1, wherein said running state detecting means comprises means for detecting a rotation speed of said engine and means for detecting a load of said engine, and said catalyst temperature detecting means estimates said catalyst temperature based on said rotation speed, said load and said convergence temperature.

8. An exhaust purifier as defined in claim 7, wherein said catalyst temperature detecting means estimates said catalyst temperature by different processes under a first condition when the exhaust is routed to said upstream converter and under a second condition when the exhaust is routed to said by-pass passage.

9. An exhaust purifier as defined in claim 8, wherein said storage means comprises a first convergence temperature map suited to said first condition and a second convergence temperature map suited to said second condition, and said catalyst temperature detecting means estimates said catalyst temperature using said first map under said first condition, and estimates said catalyst temperature using said second map under said second condition.

10. An exhaust purifier as defined in claim 7, wherein said engine is mounted on an automobile, said running state detecting means further comprises means for detecting a travel speed of said automobile, and said catalyst temperature detecting means comprises means for correcting said catalyst temperature estimated by said catalyst temperature detecting means based on said travel speed.

11. An exhaust purifier as defined in claim 10, wherein said catalyst temperature detecting means further comprises means for performing first order delay processing based on a heat transfer coefficient between the exhaust and said catalyst in said upstream catalytic converter and on a heat conductance coefficient of a bed supporting said catalyst in said upstream catalytic converter.

* * * * *